United States Patent [19]

Hartlage

[11] Patent Number: 4,810,079
[45] Date of Patent: Mar. 7, 1989

[54] POSITIONALLY ADJUSTABLE MIRROR ARRANGEMENT

[75] Inventor: John J. Hartlage, Palm Beach Gardens, Fla.

[73] Assignee: United Technologies Corporation, Hartford, Conn.

[21] Appl. No.: 133,472

[22] Filed: Dec. 15, 1987

[51] Int. Cl.$^4$ .................. G02B 7/18; G02B 26/08; G02B 5/08

[52] U.S. Cl. ..................................... 350/636; 350/486

[58] Field of Search ............... 350/636, 634, 633, 609, 350/611, 486, 487, 484, 321, 632, 252, 247; 372/107; 248/487, 479

[56] References Cited

U.S. PATENT DOCUMENTS

| | | | |
|---|---|---|---|
| 3,478,608 | 11/1969 | Met | 350/634 |
| 3,886,474 | 5/1975 | Hensolt et al. | 372/107 |
| 3,953,113 | 4/1976 | Shull | 350/634 |
| 4,003,640 | 1/1977 | Hansen | 350/611 |
| 4,151,757 | 5/1979 | Pitrat | 350/636 |
| 4,492,431 | 1/1985 | Eitel et al. | 350/611 |
| 4,664,487 | 5/1987 | Tam | 350/486 |
| 4,681,408 | 7/1987 | Ahmad et al. | 350/633 |

FOREIGN PATENT DOCUMENTS 41538 3/1977 Japan ................... 350/633

Primary Examiner—Jon W. Henry
Attorney, Agent, or Firm—Peter R. Ruzek

[57] ABSTRACT

A positionally adjustable mirror arrangement includes a holding member which is mounted on a support for pivoting about two mutually perpendicular axes. A plurality of circumferentially distributed coarse pivoting actuators pivotally displaces the holding member relative to the support about the two axes within a relatively large angular range. A mirror is mounted on the holding member for pivoting about two mutually perpendicular auxiliary axes. A plurality of circumferentially distributed fine pivoting actuators pivotally moves the mirror member relative to the holding member about the auxiliary axes within a relatively small angular range.

15 Claims, 3 Drawing Sheets

POSITIONALLY ADJUSTABLE MIRROR ARRANGEMENT

The Government has rights in this invention pursuant to a contract awarded by the Department of the Air Force.

DESCRIPTION

1. Technical Field

The present invention relates to arrangements for adjusting the spatial position of movable members in general, an more particularly to an arrangement for adjusting the position of a mirror.

2. Background Art

There are already known various constructions of arrangements for mounting mirrors for adjustment of their angular positions about two mutually perpendicular axes. Usually, the mirror is mounted on a support for pivoting about such axes by means of a universal joint, and a plurality of actuators that are circumferentially distributed at or close to the periphery of the mirror is being used to adjust the spatial position of the mirror relative to the support.

While the heretofore known constructions of the arrangements of the above type perform to satisfaction in many applications, they are less than adequate for many uses, especially in beam steering mirror systems. Such systems typically require a number of large-stroke, high-accuracy two-axis beam steering mirrors, such as tilt correction mirrors that remove vibrational tilt induced to the beam train components, or steering mirrors which constitute components of a telescope system which must be capable of providing large angle slewing and small angle retargeting. The previously proposed steering mirrors have either small stroke and high accuracy, or large stroke and low accuracy, but not both large stroke and high accuracy.

This is primarily attributable to the fact that large-stroke mirror mounting and displacing arrangements have a certain degree of leeway or inaccuracy, which may be referred-to as system hysteresis. When such system hysteresis is present, then the aiming or targeting accuracy, which is very important in steering mirrors, suffers. On the other hand, there are known precision mirror mounting and displacing arrangements, but they are capable of operating, at all or with the required precision, only within a very limited mirror displacement range. Thus, it may be seen that neither one of these approaches is satisfactory for applications where large-angle, high-precision requirements are to be met.

Accordingly, it is a general object of the present invention to avoid the disadvantages of the prior art.

More particularly, it is an object of the present invention to provide a positionally adjustable mirror arrangement, especially that of a beam steering mirror, which does not possess the disadvantages of the known arrangements of this kind.

Still another object of the present invention is so to develop the arrangement of the type here under consideration as to be able to achieve high positional accuracy over a large range of pivotal displacements.

It is yet another object of the present invention to devise an arrangement of the above type which renders it possible to achieve a very high accuracy in aiming a beam of light, especially laser light.

A concomitant object of the present invention is to design the arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a positionally adjustable mirror arrangement which comprises a support; a holding member mounted on the support for pivoting about two mutually perpendicular axes; means for pivotally displacing the holding member relative to the support about the two axes within a relatively large angular range; a mirror mounted on the holding member for pivoting about two mutually perpendicular auxiliary axes; and means for pivotally moving the mirror member relative to the holding member about the auxiliary axes within a relatively small angular range.

Advantageously, the displacing means includes a plurality of cylinder-and-piston units which are distributed about the outer periphery of the holding member and are operated by a pressurized fluid, while the moving means includes a plurality of circumferentially distributed actuators which are preferably of the electromagnetic type and are interposed between the holding member and the mirror member. It is particularly advantageous when there is further provided a reaction member and when the cylinder-and-piston units are interposed between the holding member and the reaction member, inasmuch as the system is reactionless under these circumstances.

BRIEF DESCRIPTION OF THE DRAWING

The present invention will be described in more detail below with reference to the accompanying drawing in which.

BEST MODE FOR CARRYING OUT THE INVENTION

Figure 1:
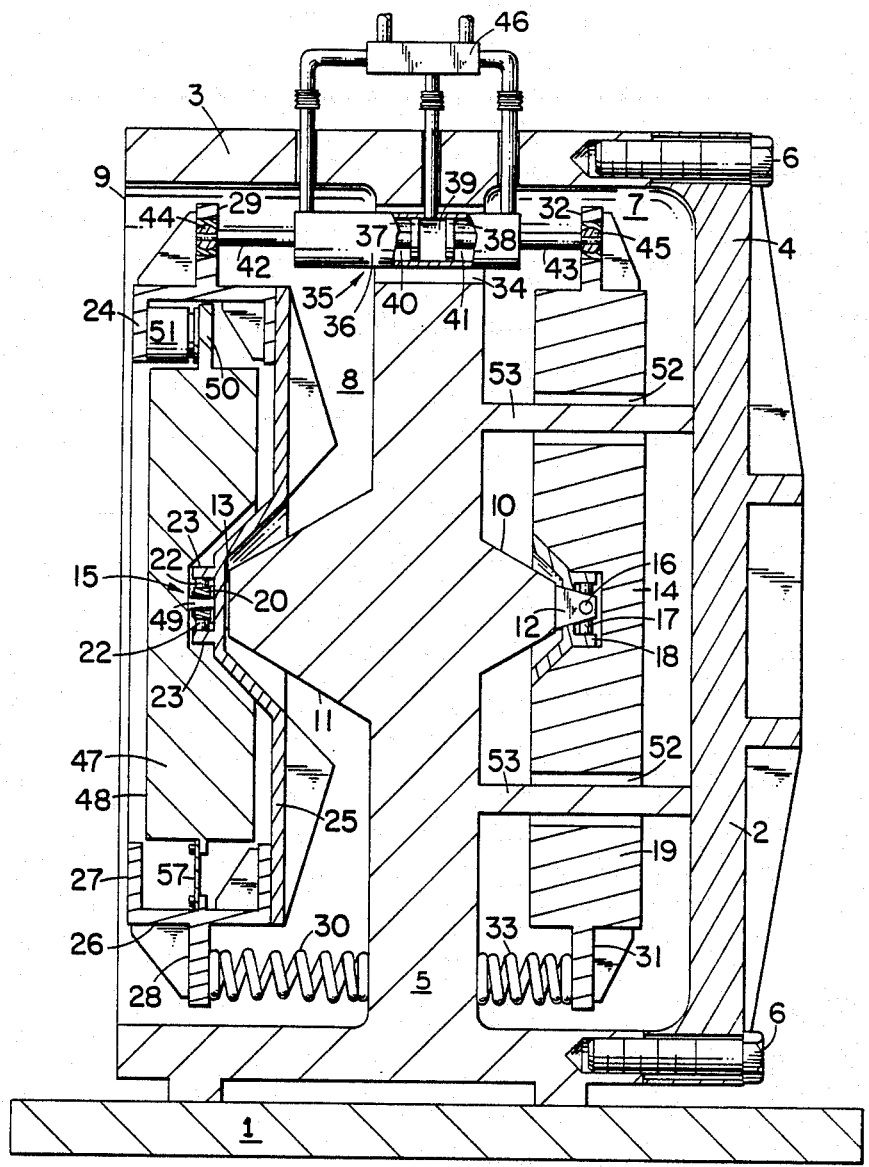
FIG. 1 is an axial sectional view of a mirror mounting arrangement of the present invention, taken on line 1—1 of FIG. 2.

Referring now to the drawing in detail, and first to FIG. 1 thereof, it may be seen that the reference numeral 1 has been used therein to identify a platform. A support or housing 2 is stationarily mounted on the platform 1. The housing 2 includes a circumferential wall 3, an end wall 4, and a partitioning or mounting wall 5. The end wall 4 is shown to be constructed as a separate lid which is connected to the circumferential wall 3 of the housing 2 by a plurality of fastening screws 6.

The partitioning wall 5 subdivides the interior of the housing 1 into two chambers 7 and 8 each of which is situated at one side of the partitioning wall 5. The chamber 7 is closed with respect to the exterior of the housing 2 by the end wall or lid 4, whereas the other chamber 8 has an open end 9 which opens to the exterior of the housing 2.

The partitioning wall 5 is provided with or carries two mounting projections 10 and 11 which project into the respective chambers 7 and 8. Each of the mounting projections 10 and 11 is provided with two respective lugs 12 or 13 that pivotally support respective universal joints 14 and 15.

The universal joint 14 includes two pivots 16 and 17 that are rigid with one another and extend at right angles with respect to each other. The pivot 16 is supported in the two lugs 12 of the mounting projection 10 for pivoting about an axis that is perpendicular to FIG. 1 of the drawing, while the pivot 17 is supported in an insert 18 for pivoting about another axis that is situated in the plane of FIG. 1 of the drawing and extends vertically. The insert 18 is received in a recess of, and is rigidly connected to, a reaction member 19, thus mounting the reaction member 19 on the mounting projection 10 with freedom of pivoting about the two aforementioned axes.

Figure 2:
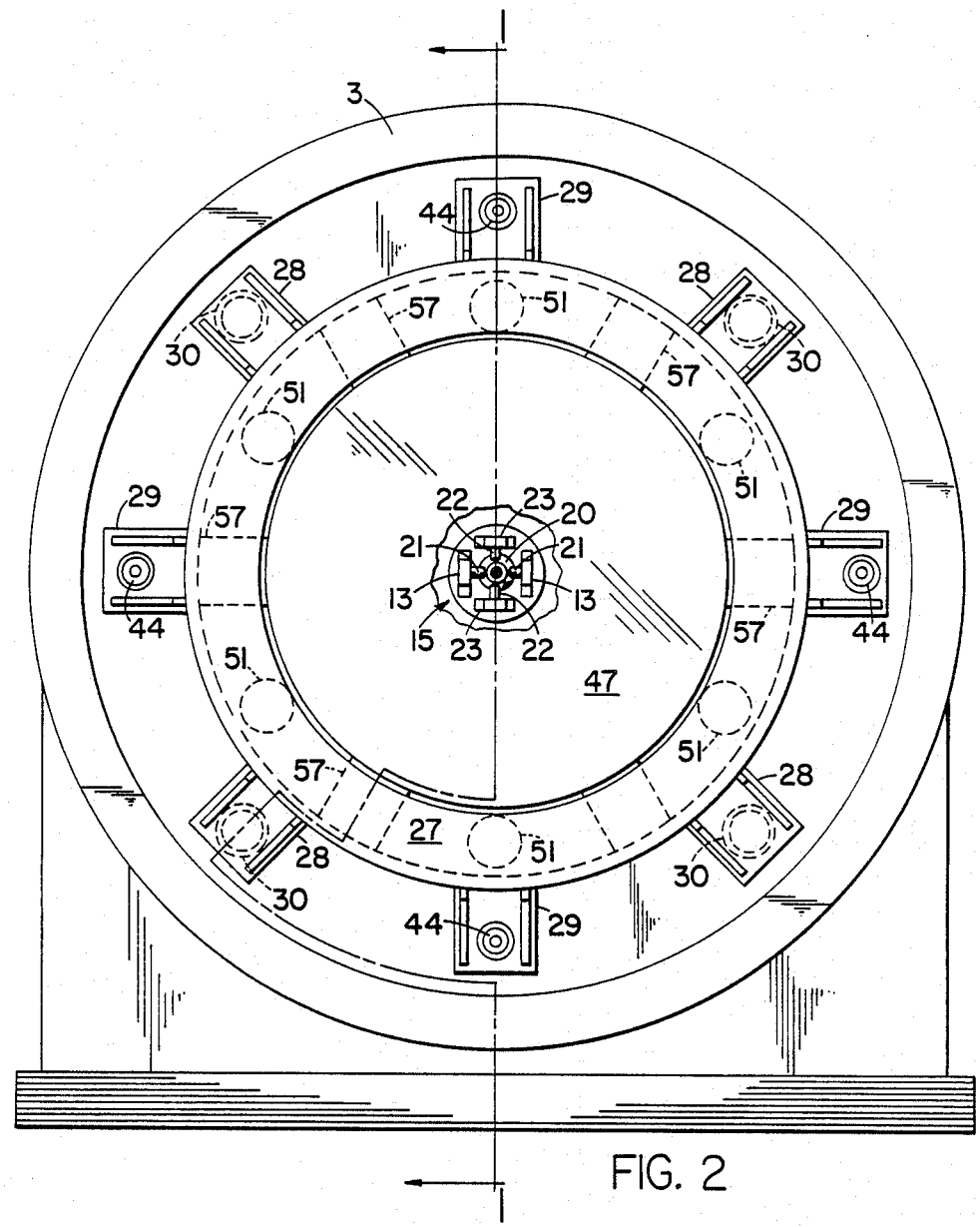
FIG. 2 is a partially sectioned end elevational view of the arrangement of FIG. 1.

As shown particularly in FIG. 2 of the drawing, the universal joint 15 includes a central annular portion 20 and two pairs of pin-shaped pivot projections 21 and 22 which extend radially outwardly from the annular portion 20. The projections 21 are centered on a first axis and are supported on the lugs 13 for pivoting about such first axis, while the projections 22 are centered on a second axis which extends perpendicularly to the first axis and are supported for pivoting about the second axis in additional lugs 23. As shown in FIG. 1, the lugs 23 are constituted by portions of a holding member 24, so that the holding member 24 is mounted on the lugs 13 of the projection 11 of the mounting wall 5 for pivoting about the first and second axes. Obviously, the lugs 13 of the mounting projection 11 pass through respective openings of the holding member 24 which are not illustrated in FIG. 1 since they are located outside the plane of the drawing.

The holding member 24 is shown to include a rear end wall 25 which carries the lugs 23, a circumferential wall 26, and a front end wall 27 which has an annular configuration. As a comparison of FIGS. 1 and 2 with one another will reveal, the holding member 24 further includes a plurality of radially outwardly extending projections or flanges 28 and 29 that alternate with one another in the circumferential direction of the holding member 24. Respective springs 30 are interposed between the flanges 28 and the mounting wall 5, thus urging the holding member 24 towards its position relative to the mounting wall 5. Similarly, the reaction member 19 is provided with alternating radially outwardly extending flanges 31 and 32, and reaction springs 33 are interposed between the flanges 31 of the reaction member 19 and the mounting wall 5, thus urging the reaction member 19 towards its rest position relative to the mounting wall 5.

The mounting wall 5 is provided with a plurality of circumferentially distributed passages 34 each of which receives, with clearance, a respective cylinder-and-piston unit 35. The cylinder-and-piston unit 35 includes a cylinder 36 having an internal space which is shown to be subdivided by two pistons 37 and 38 into a central chamber 39 delimited by the pistons 37 and 38, and to end chambers 40 and 41 situated at the opposite sides of the pistons 37 and 38. The cylinder-and-piston unit 35 further includes two piston rods 42 and 43 which are connected by respective universal joints, which are illustrated as ball joints 44 and 45 of a conventional construction, to the flanges 29 and 32, respectively. A distributing arrangement 46 of any known construction supplies a pressurized medium, such as a pressurized hydraulic fluid, to the central chamber 39 while simultaneously relieving the pressure in the end chambers 40 and 41, or simultaneously to the end chambers 40 and 41 while relieving the pressure in the central chamber 39. As a result, the respective cylinder-and-piston unit 35 will be either distended or contracted, thus causing the reaction member 19 and the holding member 24 to pivot in mutually opposite senses so that the housing 36 will conduct slight movement in the passage 34 in a transverse direction thereof, but will not conduct any movement in its axial direction provided that the oppositely moving masses are so matched that the pivoting angles thereof are identical.

The holding member 24 carries a mirror 47 which has a reflective surface 48. The mirror 47 is mounted on the holding member 24 by means of a flexible pin 49 which is rigid with or rigidly connected to both the holding member 24 and the mirror 47. The flexibility of the pin 49 permits the mirror 47 to conduct limited pivoting about mutually perpendicular auxiliary axes, both of which are normal to the longitudinal axis of the pin 49. The pin 49 passes through the center of the annular portion 20 of the universal joint 15.

The mirror 47 of FIG. 1 has a radially outwardly projecting flanges 50 which are juxtaposed with the annular front wall 27 of the holding member. A plurality of circumferentially distributed actuators 51 is interposed between the respective flanges 50 of the mirror 47 and the annular front wall 27 of the holding member 24. The actuators 51 are preferably constructed as electromagnetic actuators which, when energized, cause the mirror 47 to conduct pivoting movement about the two auxiliary axes within a limited angular range relative to the holding member 24. This limited-range pivoting is accompanied by flexing of the pin 49 which simultaneously serves as an oscillation damper. Peripheral flexures 57 which are interposed between and connected to the circumferential wall 26 of the holding member 24 and the outer peripheral portion of the mirror 47 are arranged between respective ones of the radial flanges 50 as considered in the circumferential direction.

In operation, when it is desired to adjust the aim of the mirror 47, the appropriate cylinder-and-piston units 35 are selectively operated in the desired manner first, thus simultaneously changing the position of the holding member 24 and of the mirror 47 mounted thereon. The accuracy of this positional adjustment is within about 1 milliradian, primarily due to unavoidable hysteresis in the operation of the cylinder-and-piston units 35, and the cylinder-and-piston units 35 are capable of displacing the assembly of the holding member 24 with the mirror 47 between about 1 milliradian and several degrees. While the assembly 24, 47 is being pivoted in one sense, the reaction of member 19 is being pivoted by the action of the same cylinder-and-piston units 35 in the opposite sense. The reaction member 19 may be constructed and configured in such a manner that its moment of inertia is at least approximately equal to that of the assembly 24, 47, so that the system is reactionless. However, this matching of the moments of inertia of the oppositely pivoting masses is not absolutely necessary to make the system reactionless; rather, in view of the floating arrangement of the cylinder-and-piston units 35 relative to the housing 2, any difference between such inertial moments will merely result in a difference between the angles through which the oppositely moving masses pivot, but not in a loss of the reactionless properties.

After this coarse adjustment of the position of the mirror 47 has been accomplished, the actuators 51 are energized to move the mirror 47 relative to the holding member 24 within a limited range of about 1 milliradian. When this fine adjustment of the position of the mirror 47 is accomplished, the mirror 47 is aimed exactly in, that is within about 1 microradian from, the desired direction.

FIG. 1 of the drawing also shows that the reaction member 19 is provided with through bores 52 which receive posts 53 that are rigidly connected to at least one of the partitioning wall 5 and the lid 4. These posts 53 are shown to be integral with the wall 5, however, they could be connected in any other manner.

Figure 3:
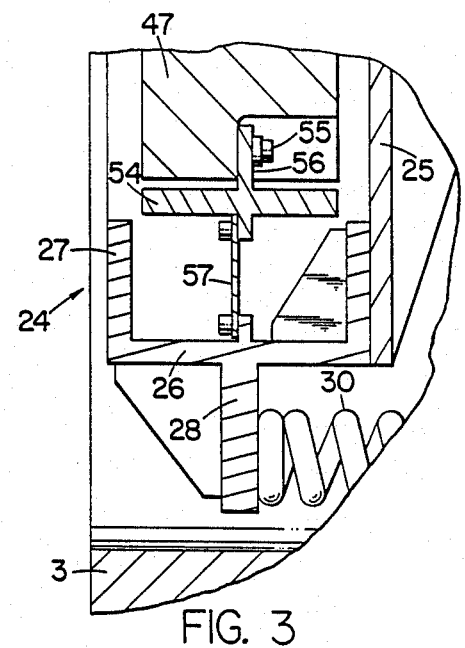
FIG. 3 is a view similar to that of FIG. 1 but showing only a fragment of the arrangement of the present invention in a modified form thereof.

Turning now to FIG. 3 of the drawing which is a fragmentary view of only a lower left-hand portion of a modified version of the arrangement of FIG. 1, it may be seen that the mirror 47 may be mounted in a mounting ring 54 by means of, for instance, screws 55 that pass through inner lugs or a flange 56 of the mounting ring 54. In this modified construction, it is the mounting ring 54 which is support at its outer periphery on the respective peripheral flexures 57 which is constituted by leaf springs or the like and which are supported at their outer periphery on the holding member 24. The peripheral flexures 57 are advantageously provided in addition to the aforementioned central flexure 49. The use of the mounting ring 54 allows a three-point mount for the mirror 47 to minimize distortion to the mirror 47 upon assembly, after polishing.

While the present invention has been illustrated and described as embodied in a particular construction of a mirror mounting arrangement, it will be appreciated that the present invention is not limited to this particular example; rather, the scope of protection of the present invention is to be determined solely from the attached claims.

I claim:

1. A positionally adjustable mirror arrangement, comprising
    a support;
    a holding member mounted on said support for pivoting about two mutually perpendicular axes and having a circumferential wall;
    means for pivotally displacing said holding member relative to said support about said axes within a relatively large angular range;
    a mirror;
    flexible means for mounting said mirror on said holding member for pivoting about two mutually perpendicular auxiliary axes such that said circumferential wall of said holding member surrounds said mirror, including a plurality of flexible members interposed between said holding member and said mirror at the periphery of the latter and extending between the inner periphery of said holding member and the outer periphery of said mirror; and
    means for pivotally moving said mirror relative to said holding member about said auxiliary axes within a relatively small angular range.

2. The mirror arrangement as defined in claim 1, wherein said means for pivotally moving includes a plurality of actuators which are distributed in the circumferential direction between said mirror and said holding member.

3. The mirror arrangement as defined in claim 2, wherein said actuators are constructed as electromagnetic actuators.

4. The mirror arrangement as defined in claim 1, wherein said flexible means includes a flexible pin rigidly connected with and interposed between said holding member and said mirror at a central region of the latter.

5. The mirror arrangement as defined in claim 1, and further comprising a plurality of circumferentially distributed springs interposed between said support and said holding member and urging the latter toward a rest position thereof.

6. The mirror arrangement as defined in claim 1, wherein said pivotally displacing means includes a plurality of circumferentially distributed actuator units.

7. The mirror arrangement as defined in claim 6, wherein said actuator units are constructed as cylinder-and-piston units that are capable of being selectively operated by a pressurized medium.

8. The mirror arrangement as defined in claim 1, wherein said pivotally displacing means includes a reaction member mounted on said support for pivoting about two mutually perpendicular reaction axes, and a plurality of circumferentially distributed actuator units extending between and connected to said holding member and said reaction member.

9. The mirror arrangement as defined in claim 8, wherein said actuator units are constructed as cylinder-and-piston units that are capable of being selectively operated by a pressurized medium.

10. The mirror arrangement as defined in claim 8, and further comprising a plurality of circumferentially distributed reaction springs interposed between said support and said reaction member and urging the latter toward a rest position thereof.

11. A positionally adjustable mirror arrangement comprising
    a support;
    a holding member mounted on said support for pivoting about two mutually perpendicular axes;
    means for pivotally displacing said holding member relative to said support about said axes within a relatively large angular range;
    a mirror;
    flexible means for mounting said mirror on said holding member, including a flexible pin rigidly connected with and interposed between said holding member and said mirror at a central region of the latter;
    means for mounting said mirror on said holding member for pivoting about two mutually perpendicular auxiliary axes, including a universal joint member having an annular portion surrounding said flexible pin and two pairs of pivot pins, each of said pivot pin pairs extending radially outwardly from said annular portion along one of said auxiliary axes and one of said pivot pin pairs being supported on said holding member while the other of said pivot pin pairs supports said mirror, for pivoting about the respective auxiliary axis; and
    means for pivotally moving said mirror relative to said holding member about said auxiliary axes within a relatively small angular range.

12. A positionally adjustable mirror arrangement, comprising
    a support;
    a holding member mounted on said support for pivoting about two mutually perpendicular axes;
    means for pivotally displacing said holding member relative to said support about said axes within a relatively large annular range, including a reaction member mounted on said support for pivoting about two mutually perpendicular reaction axes, and a plurality of circumferentially distributed cylinder-and-piston actuator units extending between and connected to said holding member and said reaction member and capable of being selectively operated by a pressurized medium, each of said cylinder-and-piston units including a cylinder bounding an enclosed internal space, two pistons received in said internal space and subdividing the same into a central chamber and two end chambers, and two piston rods each connected to one of said pistons and extending through one of said end chambers to the exterior of said cylinder-and-piston unit, one of said piston rods being connected to said holding member and the other to said reaction member;

a mirror mounted on said holding member for pivoting about two mutually perpendicular auxiliary axes; and means for pivotally moving said mirror relative to said holding member about said auxiliary axes within a relatively small angular range.

13. The mirror arrangement as defined in claim 12, and further including flexible means for mounting said mirror on said holding member.

14. The mirror arrangement as defined in claim 13, wherein said flexible means includes a plurality of flexible members interposed between said holding member and said mirror at the periphery of the latter.

15. The mirror arrangement as defined in claim 12, wherein said pivotally displacing means further includes means for selectively supplying the pressurized medium simultaneously to said end chambers while relieving the pressure in said central chamber, and supplying the pressurized medium to said central chamber while simultaneously relieving the pressure in said end chambers.

* * * * *

UNITED STATES PATENT AND TRADEMARK OFFICE
CERTIFICATE OF CORRECTION

PATENT NO. : 4,810,079

DATED : March 7, 1989

INVENTOR(S) : John J. Hartlage

It is certified that error appears in the above-identified patent and that said Letters Patent is hereby corrected as shown below:

Col. 1, Line 5     Change the paragraph "The Government has rights in this invention pursuant to a contract awarded by the Department of the Air Force" to
--This invention was made with Government support under Contract F29601-85-C-0104 awarded by the Department of the Air Force.--

Col. 5, Line 20     "support" should be --supported--

Claim 12, Line 8     "annular" should be --angular--

Signed and Sealed this

Twenty-fourth Day of July, 1990

Attest:

HARRY F. MANBECK, JR.

*Attesting Officer*     *Commissioner of Patents and Trademarks*